(12) United States Patent
Putney

(10) Patent No.: US 9,505,107 B2
(45) Date of Patent: Nov. 29, 2016

(54) BALL DEFLECTING CHAMFER

(71) Applicant: Snap-on Incorporated, Kenosha, WI (US)

(72) Inventor: Gordon A Putney, Lake Geneva, WI (US)

(73) Assignee: Snap-on Incorporated, Kenosha, WI (US)

( * ) Notice: Subject to any disclaimer, the term of this patent is extended or adjusted under 35 U.S.C. 154(b) by 763 days.

(21) Appl. No.: 13/894,075

(22) Filed: May 14, 2013

(65) Prior Publication Data
US 2014/0338942 A1 Nov. 20, 2014

(51) Int. Cl.
| B25B 21/02 | (2006.01) |
| B25D 11/10 | (2006.01) |
| F16H 25/08 | (2006.01) |
| F16H 25/12 | (2006.01) |
| B25D 16/00 | (2006.01) |

(52) U.S. Cl.
CPC .............. *B25B 21/02* (2013.01); *B25B 21/026* (2013.01); *B25D 11/102* (2013.01); *B25D 11/104* (2013.01); *F16H 25/08* (2013.01); *F16H 25/122* (2013.01); *B25D 16/00* (2013.01); *Y10T 74/2101* (2015.01)

(58) Field of Classification Search
CPC ... B25B 21/02; B25B 21/026; B25B 21/023; B25B 21/008; B25B 23/14; B25B 23/141; B25B 23/145; B25D 16/00; B25D 16/003; B25D 11/102; B25D 11/104; B25F 5/001
USPC ....... 173/178, 109, 205, 93, 93.5, 93.6, 128, 173/114, 217, 104
See application file for complete search history.

(56) References Cited

U.S. PATENT DOCUMENTS

| 2,712,254 A | * | 7/1955 | Schodeberg | .......... B25B 21/007 173/93.6 |
| 2,745,528 A | * | 5/1956 | Amtsberg | ............. B25B 21/026 173/93.6 |
| 4,919,216 A | * | 4/1990 | Ikegami | .................. B25B 19/00 173/124 |
| 5,573,074 A | * | 11/1996 | Thames | ................ B25B 21/008 173/178 |
| 5,836,403 A | * | 11/1998 | Putney | ..................... B25B 21/02 173/109 |
| 5,992,538 A | * | 11/1999 | Marcengill | .......... B25D 11/102 173/171 |
| 6,158,526 A | * | 12/2000 | Ghode | .................. B25B 21/026 173/109 |

(Continued)

FOREIGN PATENT DOCUMENTS

| CN | 1236338 A | 11/1999 |
| CN | 101362319 A | 2/2009 |

(Continued)

OTHER PUBLICATIONS

Combined Search and Examination Report, dated Nov. 19, 2014; 5 pages.

(Continued)

*Primary Examiner* — Scott A. Smith
(74) *Attorney, Agent, or Firm* — Seyfarth Shaw LLP

(57) ABSTRACT

A cam shaft is disclosed having an asymmetric chamfer for guiding a ball bearing deeper into a cam shaft groove to avoid ball loss when an immediate deceleration force is applied. The chamfer spaces the ball from an opening in the front face of a hammer that moves axially relative to the cam shaft when a tool having the cam shaft and hammer is dropped. The ball is therefore less likely to escape through the front opening of the hammer when the impact wrench is dropped.

20 Claims, 5 Drawing Sheets

(56) References Cited

U.S. PATENT DOCUMENTS

| | | | | |
|---|---|---|---|---|
| 6,227,308 B1* | 5/2001 | Ghode | ............... | B25B 21/02 173/109 |
| 7,048,075 B2* | 5/2006 | Saito | ............... | B25B 21/02 173/178 |
| 7,673,702 B2* | 3/2010 | Johnson | ............... | B25B 21/00 173/109 |
| 7,918,286 B2* | 4/2011 | Nagasaka | ............... | B25B 21/02 173/109 |
| 2007/0089891 A1 | 4/2007 | Chen | | |

FOREIGN PATENT DOCUMENTS

| | | |
|---|---|---|
| DE | 202005017305 | 2/2006 |
| TW | 412452 | 11/2000 |

OTHER PUBLICATIONS

Taiwan Search Report with English Translation dated Feb. 2, 2016; 2 pages.

State Intellectual Property Office of P.R. China First Office Action with English translation dated Feb. 29, 2016; 9 pages.

\* cited by examiner

BALL DEFLECTING CHAMFER

TECHNICAL FIELD OF THE INVENTION

The present application relates to ball bearing systems. More particularly, the present application relates to a ball deflecting chamfer that deflects a ball bearing into an advantageous position when a force is applied to the ball bearing, thus preventing inadvertent removal of the ball from the system.

BACKGROUND OF THE INVENTION

Many tools have parts that interact with each other through ball bearings. The ball is typically positioned within a groove or circular cavity and provides a rolling interface between two moving parts, reducing friction between the parts while still allowing relative movement.

For example, impact wrenches include a ball bearing interface between a cam shaft and hammer. The ball is inserted into straight or angled grooves that are defined along the exterior of the cam shaft, and interface with cooperative grooves in the hammer. One such cam shaft is shown in FIG. 5. This cam shaft 535 includes a base 540 and a shaft 545 extending from the base 540. The shaft 545 includes grooves 550 for receiving a ball bearing that interfaces with grooves in a hammer. The cam shaft 535 also includes holes 555 to receive fasteners, such as screws or nails, for attachment to other objects.

Prior art cam shafts 535 include grooves that include a vertex 560. When the impact wrench is dropped, the cam shaft 535 abruptly stops once it impacts the ground, and the deceleration forces move the balls to the vertex 560 of the cam shaft 535. At the same time, the hammer is movably disposed on the shaft 545 and moves axially against a spring, sliding over the ball bearings and allowing the ball bearings to disengage through an opening in the front face of the hammer, thus destroying the ball bearing system.

SUMMARY OF THE INVENTION

The present application discloses a structure for guiding a ball bearing deeper into a groove to avoid ball loss. The cam shaft of the present invention includes grooves that intersect at a vertex, and proximate the vertex, an asymmetric chamfer is disposed to direct the ball during deceleration forces, such as those caused by inadvertently dropping a tool. The chamfer guides the ball deeper into the groove such that the ball is spaced from the opening in the front face of the hammer. The ball is therefore less likely to disengage through the front opening of the hammer when the impact wrench is dropped.

For example, the present application discloses a cam shaft adapted for use in a tool, the cam shaft including a base, a shaft extending from the base in an axial direction, a cam shaft groove disposed circumferentially around the shaft and adapted to movably retain a ball bearing, the cam shaft groove including a plurality of groove portions extending at an angle relative to the axial direction and intersecting at a vertex, and a chamfer defined within the cam shaft groove and adapted to deflect the ball away from the vertex and toward the base when a force in the axial direction is applied to the cam shaft.

Also disclosed is an assembly including a cam shaft adapted for use in a tool, the cam shaft including a base, a shaft extending from the base in an axial direction, a cam shaft groove disposed circumferentially around the shaft and adapted to movably retain a ball bearing, the cam shaft groove including two groove portions extending at an angle relative to the axial direction and intersecting at a vertex, and a chamfer defined within the cam shaft groove and adapted to deflect the ball away from the vertex and toward the base when a force in an axial direction is applied to the cam shaft, a hammer having an opening defined therein adapted to receive the ball bearings, the opening extending through the hammer to a front face of the hammer, and a bias member disposed between the cam shaft and the hammer.

Further disclosed is a tool including a power source adapted to supply power to the tool, a trigger adapted to selectively distribute the power from the power source, an impact end adapted to receive the power and apply an impact force and/or torque to a work piece, a cam shaft including a base, a shaft extending from the base in an axial direction, a cam shaft groove disposed circumferentially around the shaft and adapted to movably retain a ball bearing, the cam shaft groove including two groove portions extending at an angle relative to the axial direction and intersecting at a vertex, and a chamfer defined within the cam shaft groove and adapted to deflect the ball away from the vertex and toward the base when a force in the axial direction is applied to the cam shaft, a hammer having an opening defined therein adapted to receive the ball, the opening extending through the hammer and to a front face of the hammer, and a bias member disposed between the cam shaft and the hammer.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

Figure 1:
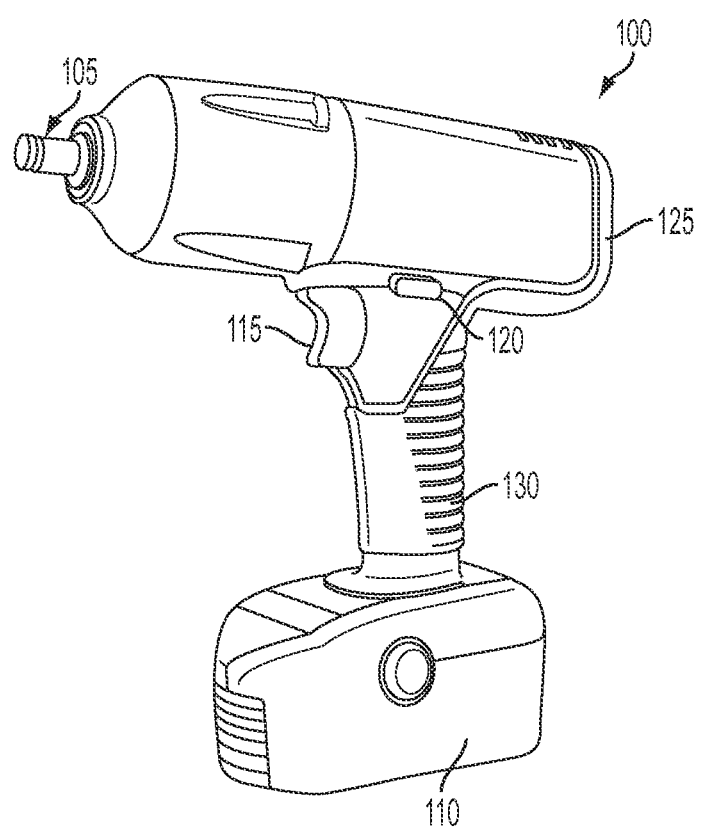
FIG. 1 is a front perspective view of an exemplar tool incorporating an embodiment of the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present application discloses a cam shaft having an asymmetric chamfer for guiding a ball bearing deeper into a cam shaft groove when a deceleration force is applied to avoid ball loss. The chamfer deflects the ball deeper into the groove and away from a front opening in the hammer during axial movement of the hammer. The ball is therefore less likely to escape through the front opening of the hammer when the tool, such as an impact wrench, is inadvertently dropped.

FIG. 1 discloses an exemplar tool 100 according to the present application. As shown, the tool 100 is an impact wrench. It is to be understood, however, that the present invention can be used with other tools or devices without departing from the scope and spirit of the present invention. In an embodiment, the tool 100 includes an impact end 105 operably coupled to a power source 110, such as, for example, a battery, fuel cell, or pneumatic source. The power source 110 supplies power to the impact end 105 when a user pulls a trigger 115. A reversing lever 120 can be disposed on the tool 100 to reverse the drive direction of the impact end 105, and a vent 125 can be defined within the housing of the tool 100 to allow excess heat to escape from the tool 100. The tool 100 can also include a grip 130 for the user to grasp 100 during use.

The power source 110 can be any source of electrical or pneumatic power that can power the tool 100. In an embodiment, the power source 110 is a battery. However, the power source 110 can be any component that provides power, including a battery, fuel cell, engine, solar power system, wind power system, hydroelectric power system, a power cord for attachment to an electrical socket, or any other means of providing power.

Figure 2:
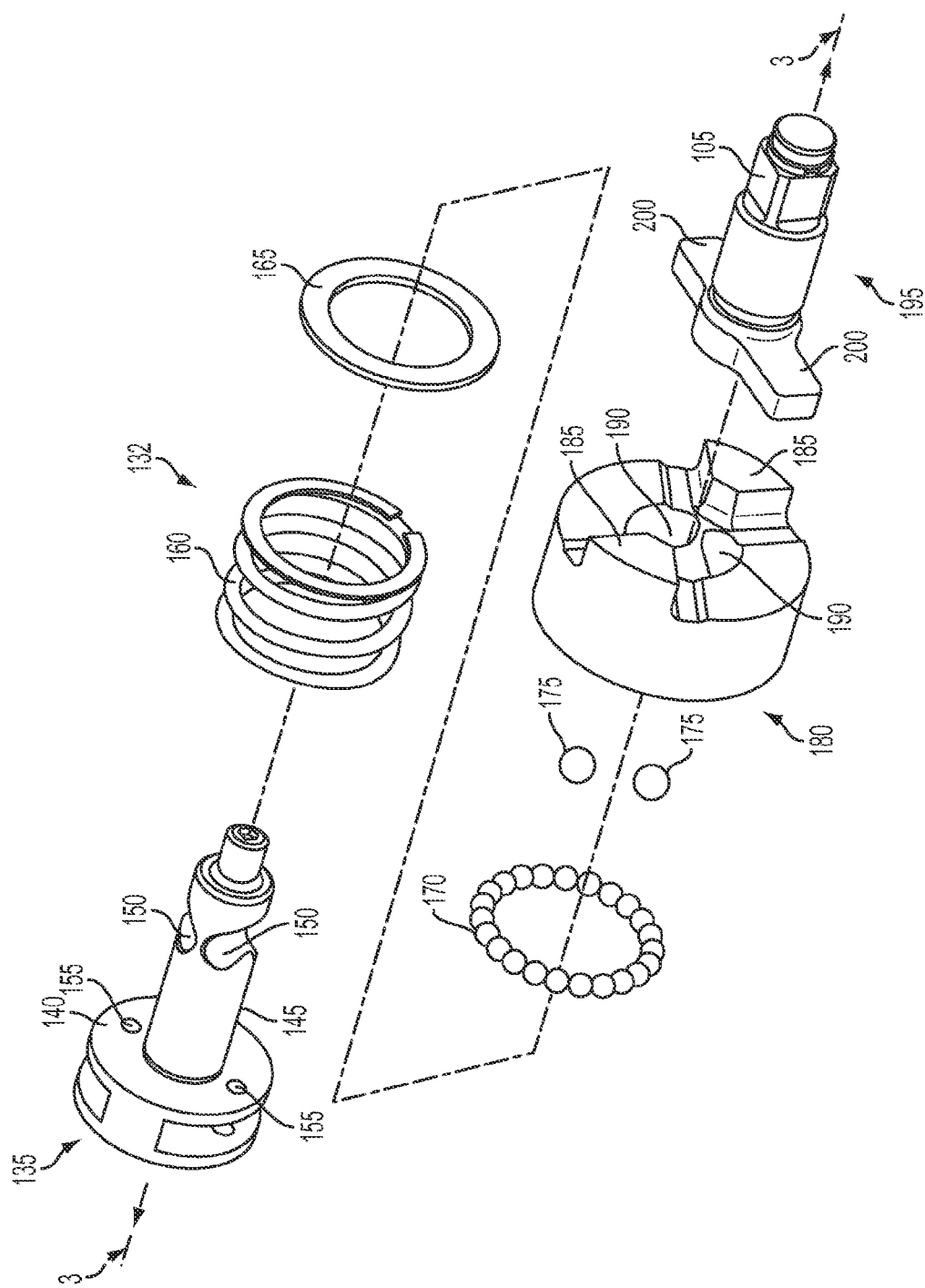
FIG. 2 is an exploded perspective view of an exemplar tool in accordance with an embodiment of the present application.
Figure 3:
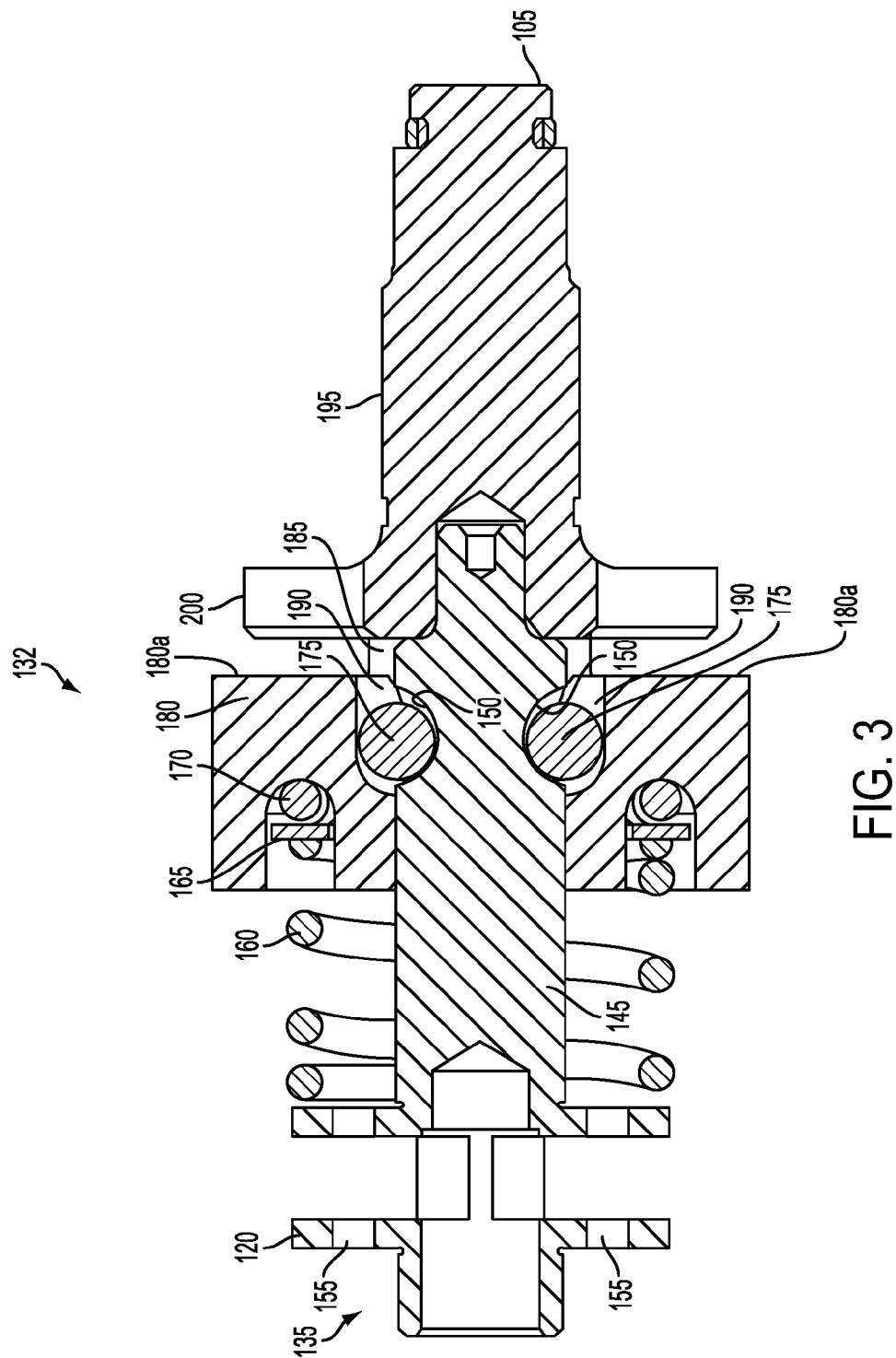
FIG. 3 is a side cross-sectional view of an assembly in accordance with an embodiment of the present application.

FIG. 2 illustrates an exploded view of an assembly 132 and FIG. 3 illustrates a side cross-sectional view of the assembly 132 in accordance with an embodiment of the present application. As shown, the assembly 132 includes a cam shaft 135 having a base 140 and a shaft 145 extending from the base 140 in an axial direction. The shaft 145 can include camshaft grooves 150 extending circumferentially around the shaft 145 and adapted to hold ball bearings. The base 155 can include holes defined therein for receiving fasteners and assembling the cam shaft 135 to other components of the tool 100.

The cam shaft 145 can abut a bias member 160 that is aligned with a washer 165 and bearing 170, as shown. One or more balls 175 can be disposed within the cam shaft grooves 150 and interface the cam shaft 145 with a hammer 180. The hammer 180 can include hammer lugs 185 for receiving radial impact, and hammer grooves 190 for receiving the ball 175. Alternately, the hammer 180 can include an opening at the front face 180a thereof, that is not divided into separate grooves. The hammer grooves 190 can also extend partially through the hammer 180 and not to the front face 180a.

An anvil 195 can be axially disposed relative to the hammer 180 and can apply the impact to the hammer 180 via the anvil lugs 200. During operation, the hammer 180 can receive power from the power source 110 and rotate discontinuously, i.e., with sporadic impact rather than a continuous rotational speed or torque. The hammer 180 can then impact the anvil 195 when the hammer lugs 185 strike anvil lugs 200, causing the anvil 195 to rotate and act upon the work piece with the impact end 105. The hammer 180 will also move axially based on the power supplied by the battery 110 and the impact provided to the anvil 195, thereby compressing the bias member 160 and moving axially along the shaft 145 of the cam shaft 135.

When the tool 100 is dropped, thereby causing an immediate deceleration force to the tool 100, the ball 175 can shift to a point in the cam shaft grooves 150 closest the front face 180a of the hammer 180, and the cam shaft 135 remains stationary. At the same time, the hammer 180 moves axially along the shaft 145 and applies more force to the bias member 160 than during normal operation due to the tool 100 being dropped. This increased force compresses the bias member 160 more so than during normal operation and places the hammer 180 deeper on the shaft 145, i.e., closer to the base 140. In doing so with athe prior art system of FIG. 5, the front face of the hammer would be located at a point closer to the base of the cam shaft than the ball positioned within the cam shaft grooves 550 at the vertex 560, thereby putting the ball in danger of escaping through the cam shaft grooves at the front face of the hammer. However, as discussed below, the improvements disclosed in the present application provide a chamfer on the cam shaft to direct the balls into a position in which they are less likely to escape.

Figure 4:
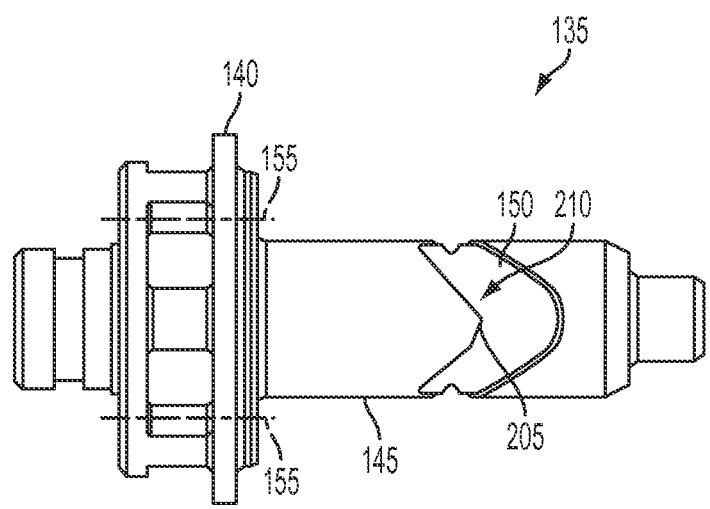
FIG. 4 is a side view of a cam shaft having an asymmetric chamfer in accordance with an embodiment of the present application.
Figure 5:
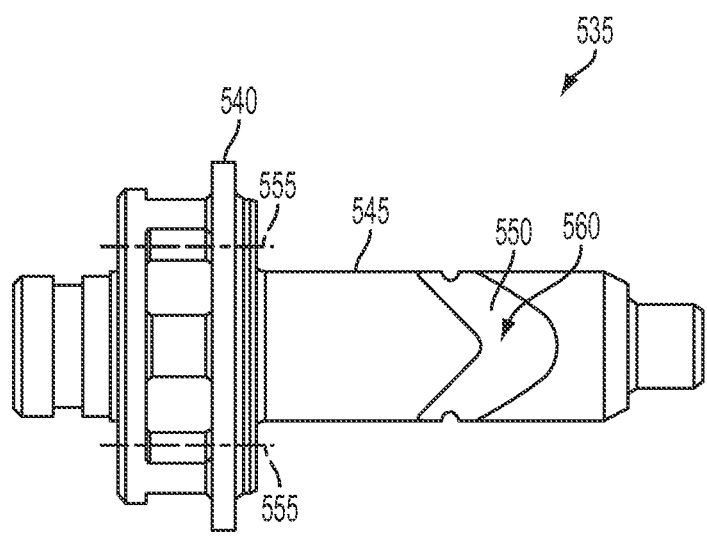
FIG. 5 is a prior art cam shaft adapted for use in impact wrenches.

As shown in FIG. 4, and as distinguished from FIG. 5, the cam shaft 135 can include a chamfer 205 proximate a vertex 210 to deflect the balls 175 deeper into the cam shaft grooves 150 as compared to the prior art example shown in FIG. 5. As shown in FIG. 4, the cam shaft grooves 150 can include two groove portions that are angled relative to the axial direction of the cam shaft 135 and that intersect at the vertex 210. During operation, if the tool 100 is dropped, and a force in the axial direction is applied to the cam shaft 135, the presence of the chamfer 205 causes the ball 175 to deflects away from the vertex 210 and then ultimately travel deeper into the angled cam shaft grooves 150 and away from the front face 180a of the hammer 180. The ball 175 is thus less likely to escape from the front face 180a of the hammer 180 when the tool is dropped.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A cam shaft adapted for use in a tool, the cam shaft comprising:
   a base;
   a shaft extending from the base in an axial direction;
   a cam shaft groove disposed circumferentially around the shaft and adapted to movably retain a ball, the cam shaft groove including groove portions respectively extending at angles relative to the axial direction and intersecting at a vertex; and
   a chamfer defined within the cam shaft groove proximate the vertex and adapted to deflect the ball away from the vertex when a force in the axial direction is applied to the cam shaft.

2. The cam shaft of claim 1, further comprising holes disposed in the base and adapted to respectively receive fasteners.

3. The cam shaft of claim 1, wherein the chamfer is defined within only one of the groove portions.

4. An tool comprising:
a cam shaft including:
  a base;
  a shaft extending from the base in an axial direction;
  a cam shaft groove disposed circumferentially around the shaft and adapted to movably retain a ball, the cam shaft groove including two groove portions respectively extending at angles relative to the axial direction and intersecting at a vertex; and
  a chamfer defined within the cam shaft groove proximate the vertex and adapted to deflect the ball away from the vertex when a force in an axial direction is applied to the cam shaft;
a hammer having an opening defined therein adapted to receive the ball, the opening extending through the hammer to a front face of the hammer; and
a bias member disposed between the cam shaft and the hammer.

5. The tool of claim 4, further comprising a washer disposed between the bias member and the hammer.

6. The tool of claim 5, further comprising a bearing disposed between the washer and the hammer.

7. The tool of claim 4, further comprising an anvil, wherein the hammer is adapted to rotate and impact the anvil.

8. The tool of claim 7, wherein the hammer includes hammer lugs, the anvil includes anvil lugs, and the hammer lugs are adapted to rotate and respectively impact the anvil lugs.

9. The tool of claim 8, wherein the anvil includes an impact end adapted to apply torque and/or impact to a work piece.

10. The tool of claim 4, further comprising holes disposed in the base and adapted to receive a fastener.

11. The tool of claim 4, wherein the chamfer is defined within only one of the groove portions.

12. The tool of claim 4, wherein the opening includes hammer grooves.

13. A tool comprising:
a power source adapted to supply power to the tool;
a trigger adapted to selectively cause power to be distributed the power from the power source;
an impact end adapted to apply an impact force and/or torque to a work piece;
a cam shaft including:
  a base;
  a shaft extending from the base in an axial direction;
  a cam shaft groove disposed circumferentially around the shaft and adapted to movably retain a ball, the cam shaft groove including two groove portions extending at respective angles relative to the axial direction and intersecting at a vertex; and
  a chamfer defined within the cam shaft groove proximate the vertex and adapted to deflect the ball away from the vertex when a force in the axial direction is applied to the cam shaft;
a hammer having an opening defined therein adapted to receive the ball, the opening extending through the hammer and to a front face of the hammer; and
a bias member disposed between the cam shaft and the hammer.

14. The tool of claim 13, further comprising a washer disposed between the bias member and the hammer.

15. The tool of claim 14, further comprising a bearing disposed between the washer and the hammer.

16. The tool of claim 15, wherein the hammer includes hammer lugs, the anvil includes anvil lugs, and the hammer lugs are adapted to rotate and respectively impact the anvil lugs.

17. The tool of claim 13, further comprising an anvil, wherein the hammer is adapted to rotate and impact the anvil.

18. The tool of claim 13, further comprising holes disposed in the base and adapted to respectively receive a fastener.

19. The tool of claim 13, wherein the chamfer is defined within only one of the groove portions.

20. The tool of claim 13, wherein the opening includes hammer grooves.

* * * * *